(12) United States Patent
Lu

(10) Patent No.: US 12,477,455 B2
(45) Date of Patent: Nov. 18, 2025

(54) INTELLIGENT QUERYING FOR NETWORK COVERAGE

(71) Applicant: T-Mobile USA, Inc., Bellevue, WA (US)

(72) Inventor: Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 377 days.

(21) Appl. No.: 18/197,032

(22) Filed: May 12, 2023

(65) Prior Publication Data

US 2024/0381241 A1 Nov. 14, 2024

(51) Int. Cl.
| | | |
|---|---|---|
| *H04W 48/20* | (2009.01) | |
| *H04W 72/54* | (2023.01) | |
| *H04W 76/38* | (2018.01) | |

(52) U.S. Cl.
CPC ........... *H04W 48/20* (2013.01); *H04W 72/54* (2023.01); *H04W 76/38* (2018.02)

(58) Field of Classification Search
CPC ..... H04W 48/20; H04W 72/54; H04W 76/38; H04W 8/02
See application file for complete search history.

(56) References Cited

U.S. PATENT DOCUMENTS

| | | | |
|---|---|---|---|
| 10,080,098 B1* | 9/2018 | Edge | H04L 63/08 |
| 2019/0312868 A1* | 10/2019 | Kiss | H04L 63/0853 |
| 2021/0274426 A1* | 9/2021 | Grayson | H04M 15/60 |
| 2024/0267993 A1* | 8/2024 | Chun | H04W 76/38 |

* cited by examiner

*Primary Examiner* — Khaled M Kassim
*Assistant Examiner* — Noah James Sugden
(74) *Attorney, Agent, or Firm* — Lee & Hayes, P.C.

(57) ABSTRACT

Techniques for intelligently setting a query timer value are described herein. For example, when a user equipment (UE) is connected to a visited public land mobile network (VPLMN) (e.g., when the UE is roaming), the UE can determine a distance metric based on the location of the UE's home public land mobile network (HPLMN) and the VPLMN and/or based on other factors to determine a query timer value. In some examples, the UE can input data to a machine learned model to determine the query timer value. The UE can initiate a querying application based on the query timer value to search for the HPLMN or more preferred VPLMNs. Determining a query timer value in this manner can minimize such querying application and can reduce battery usage for a UE.

17 Claims, 6 Drawing Sheets

INTELLIGENT QUERYING FOR NETWORK COVERAGE

BACKGROUND

Wireless communication networks are widely deployed to provide various communication services such as telephony, video, data, messaging, and broadcasts. Such networks support communications for multiple users by sharing the available network resources. A subscriber to wireless services may be associated with a subscriber profile. The subscriber's profile may be stored in association with a home public land mobile network (HPLMN), which simply may be a PLMN associated with a wireless service to which the subscriber has a relationship and/or subscription. A public land mobile network (PLMN) is a network that is operated by an administrator or a recognized operating agency (ROA) (which may both be referred to as an "operator") for the specific purpose of providing land and/or mobile telecommunication services to the public. Access to PLMN services may be achieved via an air interface involving radio communications between mobile phones and/or other wireless-enabled user equipment (UE) and land-based radio transmitters, radio base stations, and/or fiber optic networks.

As noted above, HPLMS's are typically operated by an entity to which the user of the UE is subscribed. For example, the user may have a monthly or yearly contract with a network operator (a cellular network company) that operates an HPLMN. However, in some instances, a user may travel to a location in which the cellular company (or other entity) does not have network coverage under the HPLMN. In these examples, the UE may be considered as "roaming," whereby communication coverage is not available with the HPLMN. To provide communication coverage, UE's are typically capable of radio access technology (RAT) scans. The UE may search for service on a RAT-by-RAT basis. First, the UE may perform a scan of a first RAT associated with a registered PLMN (RPLMN), or the most recent PLMN used by the UE. If a signal on which service may be acquired is found, the UE may register with the RPLMN. If not, the UE may enter a "roaming" mode, whereby the UE scans for network coverage from "foreign" networks, i.e. networks that are not operated by the subscribed to network, such as a visited PLMN (VPLMN). To allow for this, often network operators enter into roaming agreements with VPLMNs whereby non-subscribed UEs are permitted to use the foreign networks of the VPLMNs. Often, the contracts include revenue sharing, whereby a portion of the subscription profits paid by the user of the UE are provided to the foreign (or roaming) network operator. Further, VPLMN may not be able to provide a similar level or quality of services that may be provided by the HPLMN.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
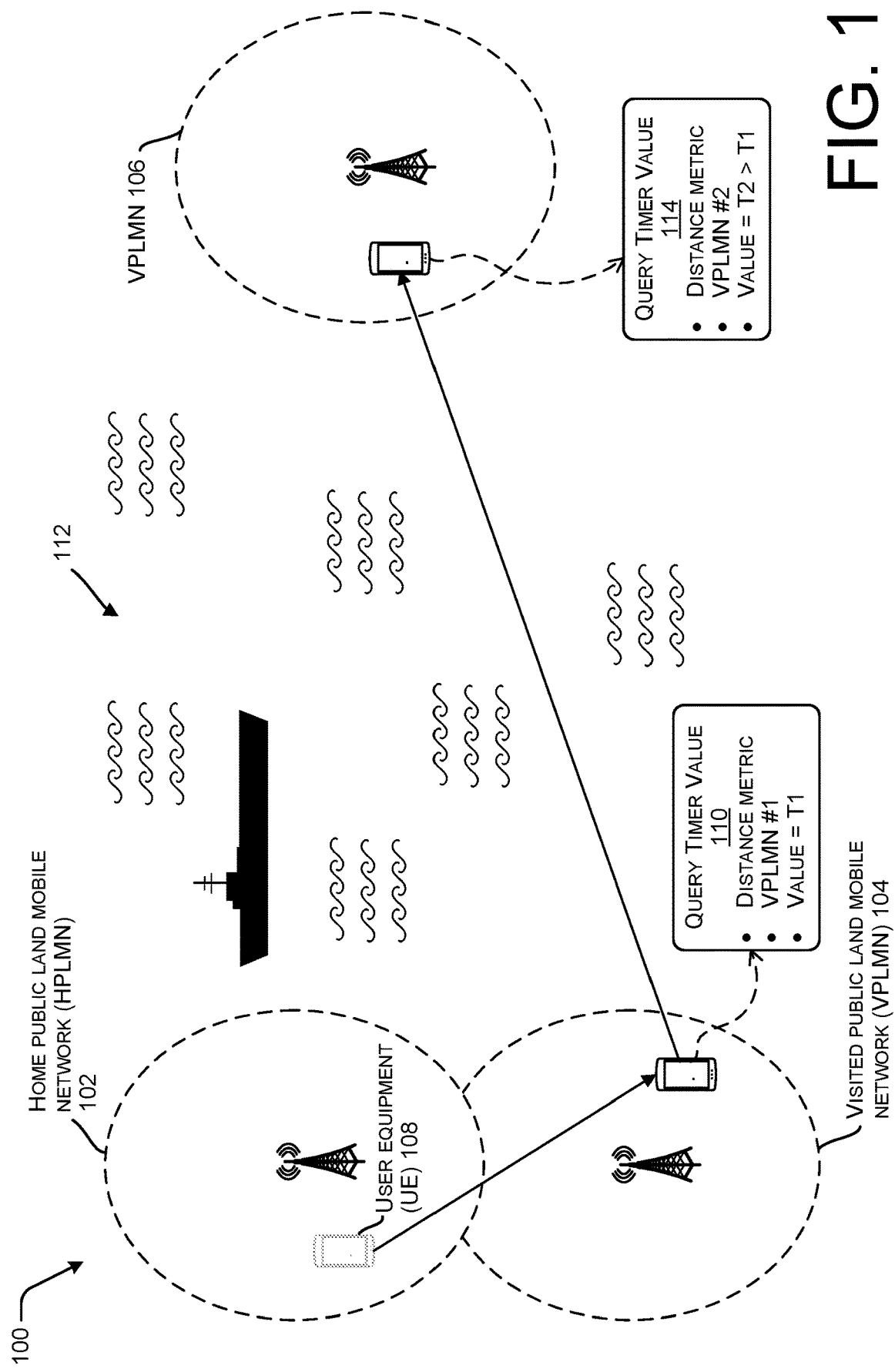
FIG. 1 illustrates an example operation environment with examples of determining a query timer value for a querying application based on a distance metric between an HPLMN and a VPLMN.

Described herein are technologies for intelligent querying of public land mobile networks to reduce battery usage. For example, when a user equipment (UE) is connected to a visited public land mobile network (VPLMN) (e.g., when the UE is roaming), the UE can determine a distance metric based on the location of the UE's home public land mobile network (HPLMN) and the VPLMN and/or based on other factors to determine a query timer value. In some examples, the UE can input data to a machine learned model to determine the query timer value. The UE can initiate a querying application based on the query timer value to search for the HPLMN or more preferred VPLMNs.

In conventional technologies, if a mobile device (or UE) is in a roaming mode, whereby the mobile device is attached to a VPLMN, the mobile device may query for more preferred VPLMN or an HPLMN. The query typically occurs at consistent intervals when in roaming mode. For example, some mobile devices query every six (6) minutes (e.g., a fixed interval or a base interval), though the interval may be different for a particular network operator or mobile device manufacturer. In some examples, when querying, the mobile device can initiate an application that transmits a query signal or otherwise performs a querying operation. In the case of sending a query signal, cellular towers within range of the query signal respond to the signal, identifying the network operator as well providing other information that may allow the mobile device to attach to a particular cellular tower. In the case of a querying operation, the UE can search for system information broadcast by a HPLMN or VPMLN, such as MIB (master information block), a system information block (SIB, such as SIB type 1), and the like. Based on the querying operation, the UE can determine the distance metric and can determine a backoff time for the next scan. Other technologies for querying may be used and are considered to be within the scope of the presently disclosed subject matter.

As a way to maximize revenue and to ensure a quality of service, among other reasons, UEs are typically programmed to continually scan for networks associated with the subscribed to network operator when the UE is using a roaming network. In some examples, networks may have preferred roaming networks. Thus, while in "roaming" mode, the UE may periodically perform a querying operation to determine if an HPLMN or a more preferred VPLMN is available. If an HPLMN or a more preferred VPLMN is available, the UE will switch from the roaming network to the HPLMN or the more preferred VPLMN. Further, a VPLMN may not provide the same services or similar quality of services that may be provided by an HPLMN.

Thus, while providing some basic level of functionality, it may be preferable to attach the UE to a VPLMN that provides better service or the HPLMN. Thus, the functionality of the UE may benefit from attaching to a more preferred VPLMN or the HPLMN.

However, an issue with conventional technologies is that the amount of energy to conduct a single querying operation drain battery resources, especially if a querying operation is performed frequently. While designed to attach the UE to a more preferred VPLMN or the HPLMN, the constant querying can act as a drain on the battery. This issue can be exacerbated by the fact that it occurs when the UE is roaming, indicating that the user in not in a familiar location in which access to a recharging power supply is readily available. This battery draining effect can most often be seen when travelling and the users see that the battery on their mobile device drains faster than normal. In some examples, the constant scanning coupled with location-based updates to various applications due to the movement of the mobile device, can cause battery drainage to be significant.

Constantly scanning (or querying by scanning) for a more preferred VPLMN or HPLMN can present various technical limitations. For example, querying for a more preferred VPLMN or HPLMN uses computing resources of the mobile device, and if the user has not moved appreciable since the commencement of the querying operation where there is an increased probability that the travel will result in the mobile device finding a more preferred VPLMN or HPLMN, the expenditure of energy and bandwidth to provide the computing resources to query are essentially unused or wasted. Further, as mentioned above, constantly querying, at relatively short time intervals, for a more preferred VPLMN or HPLMN can cause the battery of the mobile device to drain at a much faster rate than how the battery would drain during normal use. This drainage, along with other potential problems inflicted on the battery itself, can, if fully drained, leave the user without the use of a mobile device, often in an area that the user is not typically familiar with.

To alleviate some of the technical issues present in conventional art, various implementations of the present disclosure provide for varying query intervals. In some examples, when a mobile device is in a roaming mode and attached to (or using) a VPLMN, in an attempt to find a more preferred VPLMN or HPLMN, the mobile device commences the query operation. If the mobile device is unable to find a more preferred VPLMN or HPLMN, the interval of the query operations is increased an incremental amount. In some examples, the interval to the next query is incremented to a value twice of the base or first interval value. For example, initially a mobile device may query for a more preferred VPLMN or HPLMN in six (6) minute increments. According to various examples disclosed herein, if the mobile device does not receive information that a more preferred VPLMN or HPLMN is available, the next time in which the mobile device transmits a query may be twelve (12) minutes, or a doubling (or some other multiplication factor) of the initial value. According to various examples disclosed herein, if the mobile device does not receive, discover, or otherwise find information that a more preferred VPLMN or HPLMN is available when the mobile device queries upon the twelve (12) minute timer, the next time in which the mobile device transmits a query may be twenty-four (24) minutes, or a doubling of the second value. The interval between queries may be doubled (or other increase) until a limit is reached. For example, the query intervals may be doubled until the interval between the queries reaches eight (8) hours. Once the maximum interval is reached, the phone may query at that value thereafter.

In some examples, the querying operation can be performed based on a query timer value, which can be based on a distance metric associated with the UE. For example, the distance metric can be based on the relative locations of the HPLMN and the VPLMN to which the UE is attached. In some examples, the distance metric can be based on the mobile country code (MCC) associated with the PLMN, the MNC (mobile network code) associated with the PLMN, UE state data (e.g., the battery charge level, whether the UE is plugged in, whether the UE screen is active, applications that are active, and the like), network data (e.g., ping data associated with known location servers to determine an approximate location of the UE), observed networks, UE motion data (e.g., velocity and/or direction of travel (e.g., whether the UE is traveling toward or away the HPLMN)), and the like.

By way of example and without limitation, consider a case where a HPLMN for a UE is the United States. When the UE is taken to Europe, the UE can attach to a VPLMN and the MCC for a particular country (e.g., France), can be provided to the UE. In some examples, the query timer value for the UE can be set to a time period such as 6 hours, which may represent the amount of time for an airplane to fly from the France to the east coast of the United States (e.g., representing the fastest the UE may travel to a nearest location associated with the HPLMN to attach to the HPLMN). In another case, the UE with the United States as the HPLMN can be taken via automobile to Canada. The UE can attach to a VPLMN in Canada and can determine a distance metric for the UE. Because the distance between the USA and Canada is less than the distance between the USA and France, for example, and the method of travel may be different (e.g., it may be possible to drive between Canada and the USA), the query timer value may be set to a lesser value (e.g., 6 minutes, 12 minutes, 24 minutes, etc.). In some examples, the query timer value can be updated as the UE traverses the PLMN to provide the most accurate estimate of when it may be probable to query for the HPLMN or a more preferred VPLMN.

In some examples, if the UE query results in the UE attaching to a more preferred VPLMN or HPLMN, the interval value (the query timer value discussed herein) may be reset to a reset value (determined as discussed herein). In the examples in which the UE attaches to a more preferred VPLMN but not the HPLMN, the interval may be reset, may be maintained at the maximum value, or may be changed to another value between the minimum value and the maximum value. In some examples, by intelligently varying the interval value for the querying operation, as the mobile device stays in the roaming mode, the querying occurs changes based on the likelihood of attaching to a more preferred networks (e.g., which may occur a rate inversely proportional to the distance between the HPLMN and the VPLMN). As can be understood, this reduction in the rate may both reduce the potential for wasted computing resources (e.g., reducing network congestion due to a reduction in querying operations) as well as reduce the rate of battery drainage caused by the querying operations. These and other improvements to the functioning of the mobile device are discussed herein.

FIG. 1 illustrates an example operation environment 100 with examples of determining a query timer value for a querying application based on a distance metric between a home public land mobile network (HPLMN) 102 and visited public land mobile networks (VPLMNs) 104 and 106.

In some examples, a user equipment (UE) 108 can be associated with the HPLMN (e.g., when the UE 108 is attached to the HPLMN 102, by definition, it is not roaming). When the UE 108 is attached to the VPLMNs 104 or 106 the UE 108 may be considered roaming.

As noted above, in some examples, when the UE 108 is attached to the VPLMN 104 it may be considered to be roaming. In some examples, the UE 108 can determine a distance metric between the HPLMN 102 and the VPLMN 104. In some examples, the distance metric can be based on an identifier associated with the VPLMN 104 (e.g., a mobile country code (MCC), a mobile network code (MNC), and the like). In some examples, the UE 108 can determine a location of the UE 108 (e.g., using GPS, triangulation, and the like). In some examples, the UE 108 can determine a query timer value 110, which may be based on a distance metric, an identifier associated with the VPLMN 104, as well as other factors discussed herein. By way of example, the query timer value 110 can be referred to as a value T1 (time 1).

By way of another example, and without limitation, the UE 108 can further travel to a region associated with the VPLMN 106 and can attach to the VPLMN 106 in a roaming state. In this example, the VPLMN 106 is separated from the HPLMN 102 via a waterway 112, illustrated by waves and a boat in FIG. 1. The geography provides distance and limitations on the ability for a user associated with the UE 108 to travel from the region associated with the VPLMN 106 to the HPLMN 102. For example. Accordingly, the UE 108 can determine a query timer value 114 while the UE 108 is attached to the VPLMN 106 in a roaming configuration, such that the value of the query timer value 114 is T2 (time 2), which is greater than T1 (e.g., T2>T1). In this manner, while the UE 108 is roaming in the VPLMN 106, the UE 108 will query for the HPLMN 102 less frequently than when the UE 108 queries for different networks while roaming in the VPLMN 104.

Additional details of the query timer value(s) and example of implementing such query timer value based on UE data are discussed in further figures throughout this disclosure.

Figure 2:
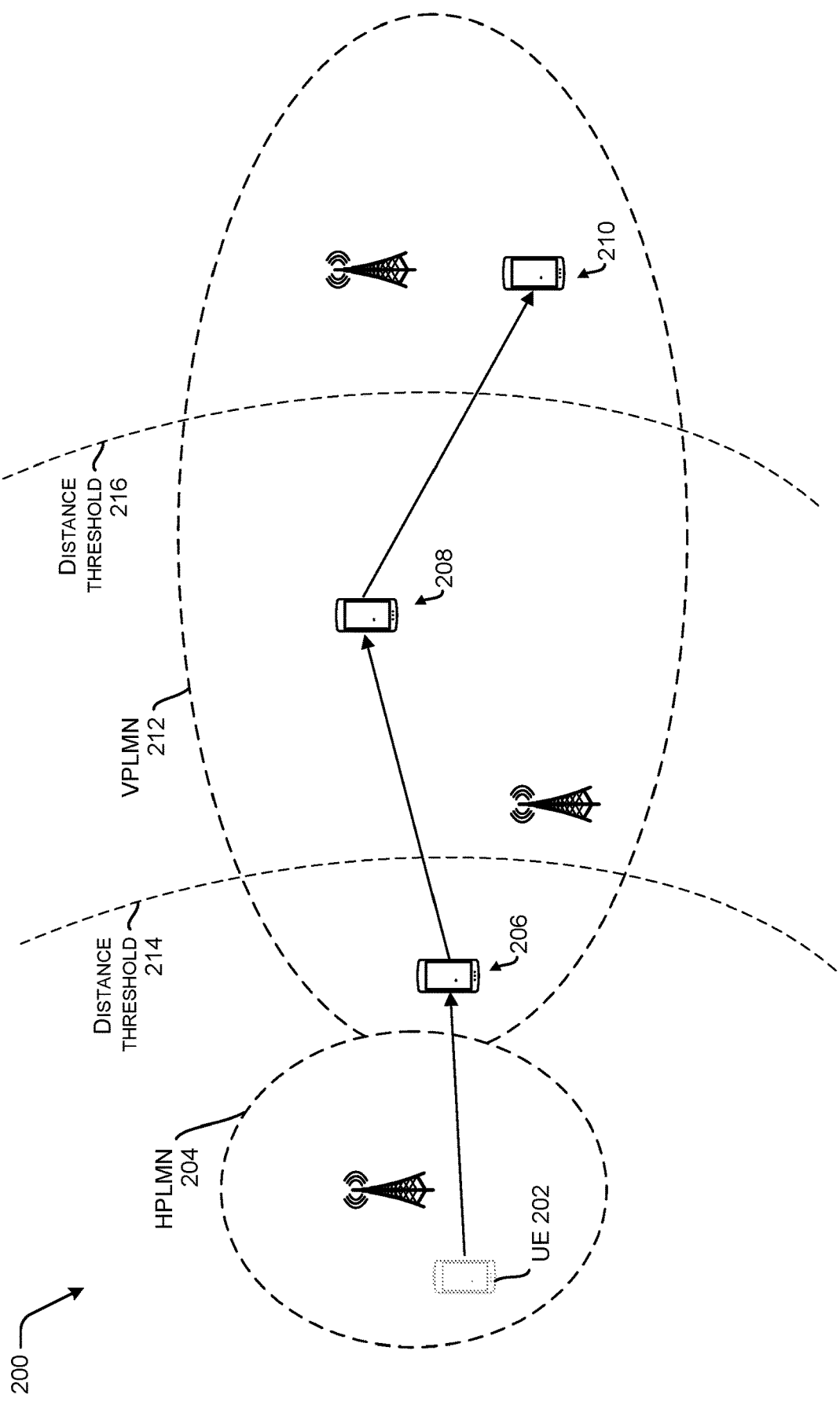
FIG. 2 illustrates another example operation environment with examples of determining a query timer value for a querying application based on a location of a UE relative to distance thresholds.

FIG. 2 illustrates another example operation environment 200 with examples of determining a query timer value for a querying application based on a location of a UE relative to distance thresholds.

As illustrated, the environment 200 includes a UE 202 in an HPLMN 204 traversing to various locations 206, 208, and 210 within a VPLMN 212. As can be understood, the location 206 represents a location in the VPLMN 212 wherein the distance between the UE 202 and the HPLMN 204 is below a distance threshold 214. Further, the location 208 represents a location in the VPLMN 212 wherein the distance between the UE 202 and the HPLMN 204 is above the distance threshold 214 and below a distance threshold 216. Further, as illustrated, the location 210 represents a location in the VPLMN 212 where the distance between the UE 202 and the HPLMN 204 meets or exceeds the distance threshold 216.

In some examples, a query timer value can be set based on location of the UE 202 relative to the distance threshold(s) 214 and/or 216. For example, the query timer value can be set to a first value V1 at the location 206, a second value V2 at the location 208 and a third value V3 at the location 210, whereby the V1<V2<V3, such the time period between queries increases as the UE 202 moves from the location 206 to the locations 208 and 210.

In some examples, different algorithms can be used for determining the query timer value when the UE 202 is in the location 206, 208, or 210. For example, when the UE 202 is at the first location 206, the UE 202 can set the query timer value to be a multiple of a fixed value (e.g., 6 minutes), whereby the multiple is set based on the number of times a query application is called (e.g., the query timer value is 6 minutes, and then 12 minutes, and then 24 minutes, 48 minutes, etc. to a maximum value).

By way of another example, and without limitation, when the UE 202 is at the second location 208, the UE 202 may determine a query timer value based on a distance metric and/or based on UE data, as discussed herein. For example, the UE 202 may set a base value of a query timer value to be a value (V2, such as 6 minutes, 10 minutes, 20 minutes, 24 minutes, 1 hour, etc.) such that the query timer value may be incremented each time the querying application is called (e.g., the query timer value may be V2*M, wherein M is the number of times the querying application has been called, up to a maximum value).

By way of another example, and without limitation, when the UE 202 is at the third location 210, the UE 202 may determine a query timer value based on another distance metric and/or based on UE data, such that the base value of query timer value may be V3 (such that V3>V2). In some examples, the query timer value may be set such that the UE 202 does not query for the HPLMN 204 or another VPLMN while the UE 202 is at the location 210.

As can be understood, other examples are within the scope of FIG. 2 and are discussed throughout the disclosure.

Figure 3:
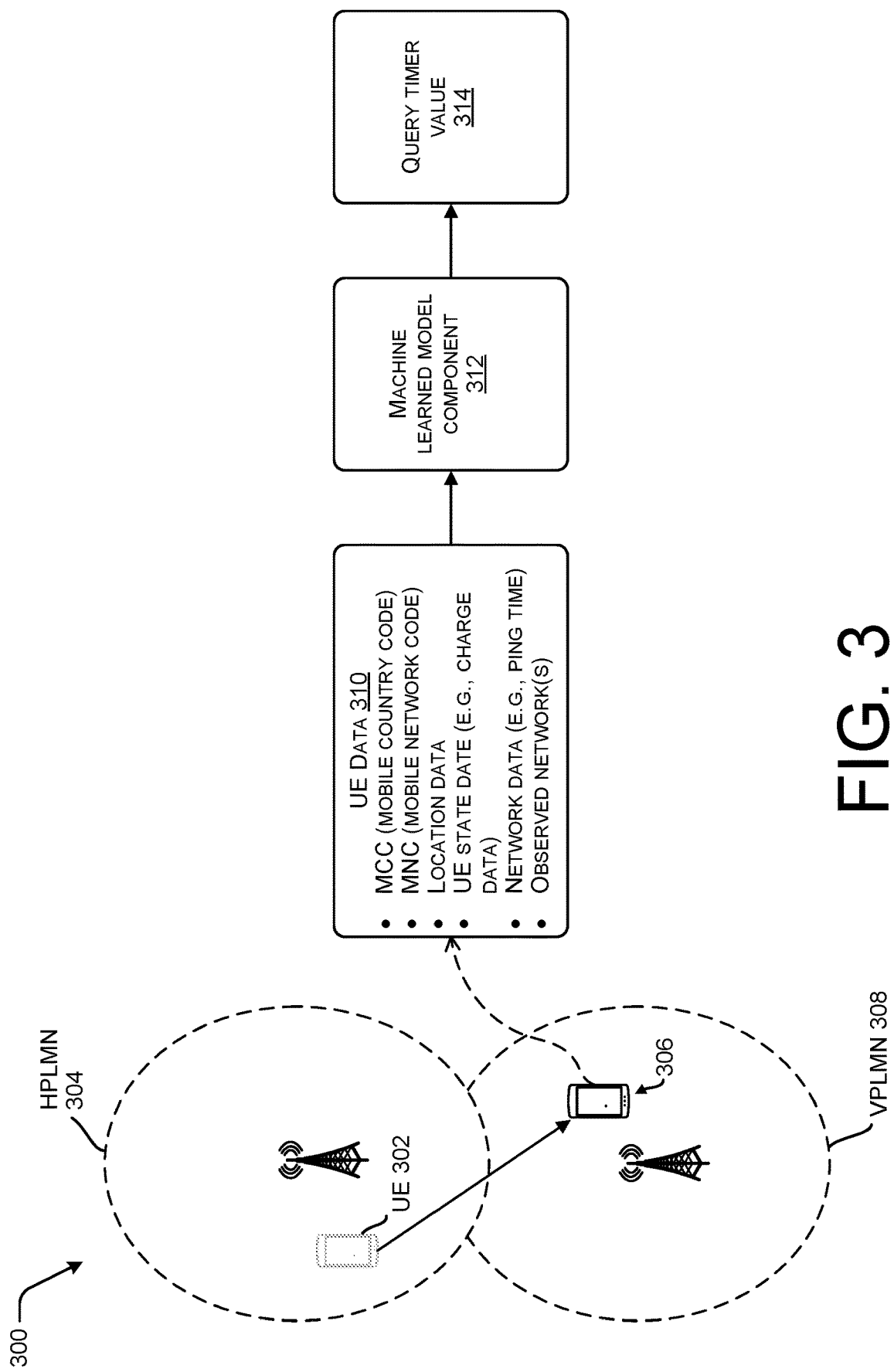
FIG. 3 illustrates an example operation environment for determining UE data and inputting such UE data to a machine learned model component for determining a query timer value for a querying application.

FIG. 3 illustrates an example operation environment 300 for determining UE data and inputting such UE data to a machine learned model component (also referred to as a machine learning algorithm) for determining a query timer value for a querying application.

For example, the environment 300 can include a UE 302 associated with an HPLMN 304 and traversing to a location 306 in a VPLMN 308. While at the location 306, the UE 302 can determine UE data 310. In some examples, the UE data can include, but is not limited to, one or more of a mobile country code (MCC), a mobile network code (MNC), location data (e.g., determined by GPS, etc.), UE state data (e.g., battery level (also referred to as battery state data), whether the UE is charging, the UE display status (e.g., on/off), application(s) running on the UE, and the like), network data (e.g., ping time (e.g., milliseconds) for servers location in different locations (e.g., in the HPLMN 304 or the VPLMN 308) to be used to roughly determine location), observed networks, UE accelerometer data, UE motion data (e.g., velocity data and/or direction data (e.g., whether the motion is towards the HPLMN or away from the HPLMN)), and the like.

In some examples, the UE data 310 can be input to a machine learned model component 312, which can output, based on the UE data 310, a query timer value 314.

In some examples, the machine learned model component 312 can be trained based on exemplary UE data and outcome data associated with UE battery level and roaming charges (or a metric associated with data transferred while connected to a roaming network). The machine learned model component 312 can be trained to minimize the roaming charges or data transferred while connected to a roaming network, and to maximize UE battery state while roaming. Accordingly, the machine learned model component 312 can be trained to minimize roaming charges and/or data transferred while on a roaming network by setting a query timer value to control when a UE initiates a querying application to search for additional preferred VPLMNs or a HPLMN.

Figure 4:
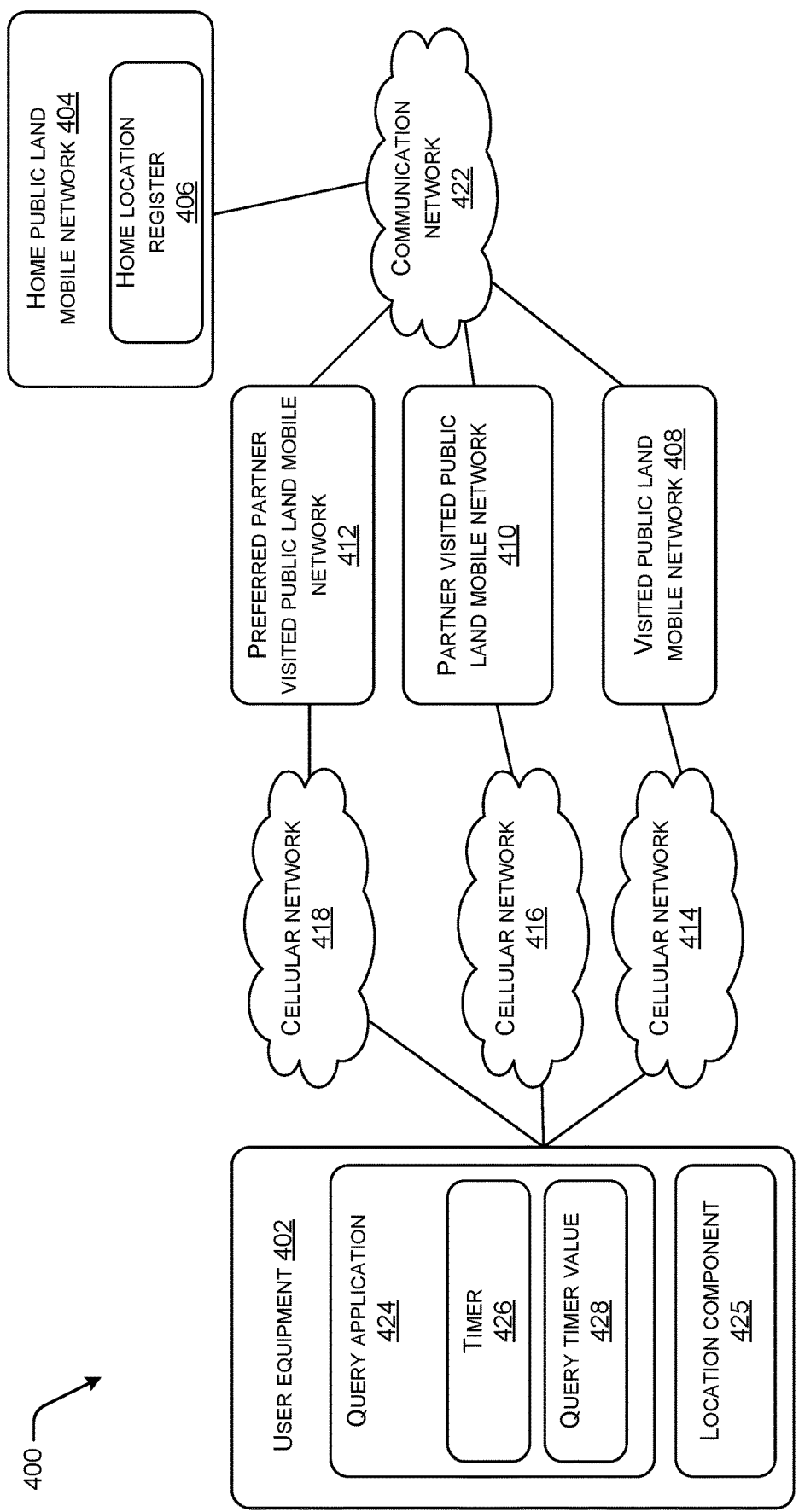
FIG. 4 illustrates an example operation environment for providing incremental querying for network coverage.

FIG. 4 illustrates an example operation environment 400 to provide incremental querying for network coverage. User equipment 402 may be a mobile device used by a user (not pictured), a computer, laptop, or the like. The user equipment 402 may be compatible with one or more types of communication networks, such as, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-436/TDMA), and Integrated Digital Enhanced Network (iDEN). In some examples, the communications networks described herein can include any network topologies including, but not limited to, 2G, 3G, 4G, 4G LTE, 5G, Wi-Fi, Bluetooth, Bluetooth Low Energy, and the like. In other examples, the communication network can be wired or wireless Internet Protocol-based networks capable of establishing communication with a communication services server.

In FIG. 4, the user equipment 402 is subscribed to a network operator (not shown) that owns or controls home public land mobile network (HPLMN) 404. In various examples, the HPLMN 404 may be considered the "home network" of the user equipment 402. To maintain a database of the subscribers to the HPLMN 404, the HPLMN 404 has stored therein home location register (HLR) 406. The Home Location Register (HLR) is a database of permanent or semi-permanent subscriber information for a mobile network. Maintained by the subscriber's home carrier (or the network operator where the user initiated the call), the HLR 406 includes pertinent user information, including address, account status, and preferences. In some examples, the HLR 406 may be a function of, or replaced by, a home subscriber server. In some systems, a home subscriber server (HSS) is used in IMS, 4G, and 4G-LTE applications, whereas the HLR 406 is used in 2G and 3G applications. It should be understood that the presently disclosed subject matter is not limited to any particular network type, network evolution, or network standard.

If the user equipment 402 is not in an area covered by a cell tower controlled by the HPLMN 404, in order to provide service to a user operating the user equipment 402, the user equipment 402 may query and attach to a non-home PLMN. In the example illustrated in FIG. 4, networks that may be used by the user equipment 402 depending on the coverage include a VPLMN 408, a partner VPLMN 410, and a preferred partner VPLMN 412. Cellular network 414 is provided by the VPLMN 408. Cellular network 416 is provided by the partner VPLMN 410. Cellular network 418 is provided by preferred partner VPLMN 412.

As noted above, the network operator for the HPLMN 404 may enter into agreements with other PLMN's to provide coverage for their subscribers when not in the network of the HPLMN 404. In FIG. 1, the HPLMN 404 has entered into an agreement with the preferred partner VPLMN 412. In that instance, if the user equipment 402 is out of the network of the HPLMN 404 and the preferred partner VPLMN 412 is available, the user equipment 402 will preferably attach to the preferred partner VPLMN 412 over other, non-preferred partner VPLMNs. For example, if both the preferred partner VPLMN 412 and the partner VPLMN 410 are available for use, the user equipment 402 will preferably attach and use the preferred partner VPLMN 412. In a similar manner, the user equipment 402 will preferably attach to a preferred or partner VPLMN over other VPLMNs.

For example, if the partner VPLMN 410 and the VPLMN 408 are available, and the HPLMN and the preferred partner VPLMN 412 are not, the user device will preferably attach to and use the partner VPLMN 410 over the VPLMN. In some examples, a contractual relationship may not exist specifically between the HPLMN 404 and a VPLMN, such as the VPLMN 408. In these examples, the VPLMN 408 may be part of an industry consortium or standard whereby, even though a contract does not exist, the VPLMN 408 agrees to provide coverage to the user equipment 402. This often happens in areas in which cellular companies are relatively new or largely unregulated.

When the user device attaches to the VPLMN 408, the partner VPLMN 410, or the preferred partner VPLMN 412, the respective VPLMN communicates with the HPLMN 404 of the user equipment 402 to determine if the user device is authorized to be attached to the respective VPLMN. When contacted through the communication network 422, which may be an international communication network, the HPLMN 404 accesses the HLR 406 to determine subscriber status of the user equipment 402, then, if the user equipment 402 is authorized, transmits that information to the VPLMN so the VPLMN can attach the user equipment 402 to its service.

When the user equipment 402 is in a roaming mode and attaches to the VPLMN 408, the partner VPLMN 410, or the preferred partner VPLMN 412, the user equipment 402 may be programmed to query available PLMNs to determine if the user equipment 402 has moved into an area covered by the HPLMN 404 or an area covered by a more preferable PLMN than the PLMN the user equipment 402 is currently attached to. In order to do so, the user equipment 402 has a query application 424. The query application 424 may be part of a general operating system, another application, or an individual, standalone application. The query application 424 is configured to cause the user equipment 402 to perform a querying operation to determine the available network coverages. In the case of a querying signal, and in some examples, the networks that received the signal and are available for use transmit a response. The query application 424 determines if the user equipment 402 should switch to another network. For example, if the user equipment 402 is currently attached to the cellular network 414, but a response indicates that the cellular network 416, associated with the partner VPLMN 410 is available, the user equipment 402 may switch from the cellular network 414 to the cellular network 416. To do so, the query application 424 has a timer 426. The timer 426 provides a timing signal to the query application 424 to inform the query application 424 to perform a query operation. The timer 426 may be part of a clock mechanism used by the user equipment 402 to control various operations or a separate function.

The timer 426 is used by the query application to determine when the next query operation is to be performed. In conventional technologies, the timing is typically set by the network operator to which the user equipment 402 is subscribed or is a program within the user equipment 402 as established when a user receives the user equipment 402 for use. According to various implementations described herein, the query application 424 has a query timer value 428. The query timer value 428 is a value within the function of the query application 424. In some examples, the query timer value 428 may be the set value used in conventional technologies. However, according to various implementations described herein, the query timer value 428 is modified based on the query operations performed by the query application and/or is determined using the techniques discussed herein. As the query application 424 instructs the user equipment 402 to query for network coverage, the query timer value 428 may be incremented a predetermined amount of time. In some examples, the value of incremental increase may be an integer increase, a fractional increase, or a resultant increase of the application of a mathematical formula on the query timer value 428. In some examples, the query timer value 428 can be set or determined based on distance metric(s) and/or UE data, as discussed herein.

For example, if the current query timer value 428 is 6 minutes, the query timer value 428 may be incremented by 2. In that example, the next query for network coverage may occur 42 minutes after the last query, rather than the original query timer value, or the prior 6 minutes. In another example, if the current query timer value 428 is 6 minutes, the query timer value 428 may be incremented by a whole number such as 40 minutes. In that example, the next query for network coverage may occur 16 minutes after the last query, rather than the original or prior 6 minutes. These and other types of determining an incremental number are considered to be within the scope of the present disclosure.

Various reasons for incrementing the query timer value 428 are discussed above. Some examples include reducing the use of computing resources and reducing battery drainage. There may be additional reasons for incrementing the query timer value 428. For example, if one or more of the initial queries indicates that the currently attached VPLMN is the only or most preferred VPLMN available, there may be a chance that the user having the user equipment 402 is not moving distances in which another, more preferred network may be available. Thus, to query at the same rate may essentially be viewed as detaching or disassociating the operation from the situation.

In some examples, the query timer value 428 may be incrementally increased up to a maximum value. For example, a maximum value may be 8 hours, and in some cases, the maximum value may be based on the distance metric as discussed herein. Therefore, when incrementing the query timer value 428, the query timer value 428 may be incremented up to 8 hours. Additional queries after that will be timed to occur 8 hours after the prior query, according to the example provided. The maximum value may be changed or may be a set value, the present disclosure not being limited to any particular maximum value. Further, in some examples, a maximum value may not be introduced, allowing the query timer value 428 to be continually incremented.

In some examples, the query timer value 428 may be reset or reduced to a smaller value. For example, if after a query or other operation the user equipment 402 is handed over from the VPLMN 408 to the HPLMN 404, the query timer value 428 may be reset to the original value. This may be done for various reasons. For example, resetting the query timer value 428 may essentially reset the user equipment 402 to the default configuration or the original condition. In some examples, the query timer value 428 may be reset if the user equipment 402 loses coverage of all VPLMNs. For example, the user may travel to an area without any network coverage. In another example, the user may switch the user equipment 402 to "airplane mode," whereby the transceiver of the user equipment 402 is inoperable. In these and other examples, the user equipment 402 loses network coverage and it may be desirable to reset the query timer value 428 to a smaller value, or the original value. Further, the manner in which network coverage is lost may be used to determine how the query timer value 428 is reset. For example, the user equipment 402 may detect that network coverage is being lost and regained in small intervals, indicating spotty or sparse network coverage. In this example, the user equipment 402 may determine that there is a probability that the loss of coverage with the same VPLMN is temporary (for example, less than a particular time, such as 5 minutes) by detecting that each time the user equipment 402 has been disconnected from the VPLMN, the user equipment 402 is able to reattach to the VPLMN within a short period of time. In that example, it may be preferable to not reset the query timer value 428. In some examples, such as an initial attachment to a VPLMN after losing coverage with the HPLMN 404 or the initiation of Airplane Mode, the user equipment 402 may reset the query timer value 428 as those situations are not indicative of a temporary loss of coverage with the same VPLMN or HPLMN.

In some examples, the query timer value 428 may be adjusted based on user activity, such as movement. For example, the query application 424 may receive input from a location component 425 of the user equipment 402 that the user equipment 402 has not moved from a location to a predetermined distance within a period of time. For example, the location component 425 may determine that the user equipment 402 has not moved more than 40 feet within a twenty-four-hour period of time. The detection of non-movement may be received by the query application 424, resulting in an increase of the query timer value 428 above other incremental increases, such as those described above.

In other examples, the query application 424 may receive input from the location component 425 that the user equipment 402 has moved more than a predetermined distance in a predetermined period of time. In some examples, the movement may indicate an increased probability that the user has entered in an area covered by a more preferred VPLMN or the HPLMN. In this example, if the user equipment 402 has moved more than a predetermined distance in a predetermined period of time, the query timer value 428 may be decreased or reset to a default value, or another value as determined by the system. It should be understood that the presently disclosed subject matter is not limited to the use of global positioning systems, as other technologies may be used to determine location.

Figure 5:
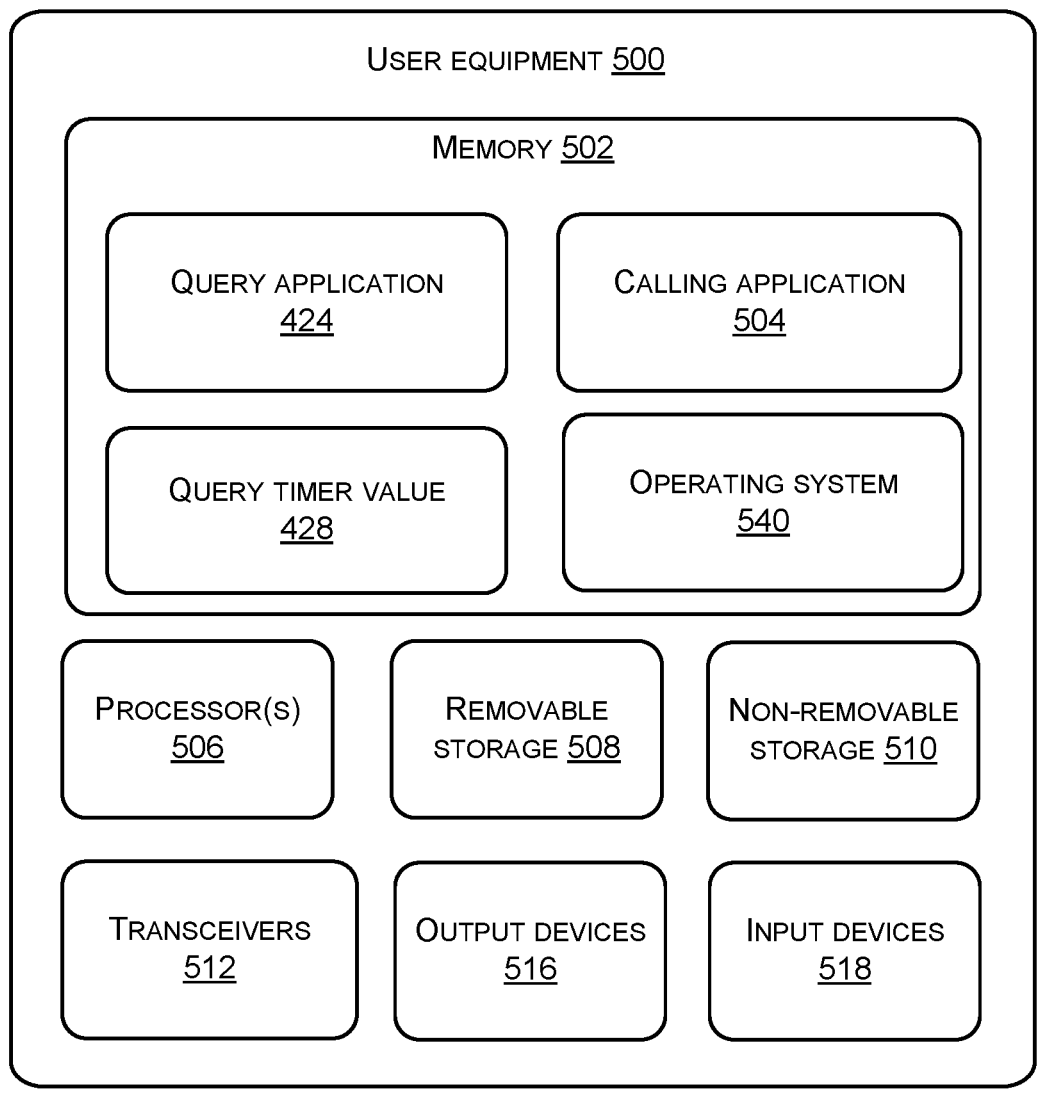
FIG. 5 illustrates a component level view of a user device configured for use within a wireless communication network.

FIG. 5 illustrates a component level view of a user device 500 configured to provide intelligent querying for network coverage within a wireless communication network. As illustrated, the user device 500 comprises a system memory 502 that stores computer-executable instructions to implement a calling application 504. In some examples, the calling application 504 may be the software application used by the user device 500 to initiate and/or receive telephone calls between the user device 500 and a network, such as the cellular network 418, the cellular network 416, the cellular network 414, or a network controlled by the HPLMN 404. The system memory 502 also is storing computer-executable instructions to implement the query application 424. As noted above, the query application 424 is initiated by the user device 500 to query for the presence of various networks, such as a more preferred VPLMN or the HPLMN 404. The system memory 502 also is storing the query timer value 428. The system also is storing computer-executable instructions to implement the operating system 540. The operating system 540 is executed by processor(s) 506 and controls operational aspects of the user device 500, such as the query application 424, the query timer value 428, and the calling application 504.

The user device 500 includes the processor(s) 506, a removable storage 508, a non-removable storage 510, transceivers 512, output device(s) 516, and input device(s) 518.

In various implementations, the system memory 502 is volatile (such as RAM), non-volatile (such as ROM, flash memory, etc.) or some combination of the two. In some implementations, the processor(s) 506 is a central processing unit (CPU), a graphics processing unit (GPU), or both CPU and GPU, or any other sort of processing unit.

The user device 500 may also include additional data storage devices (removable and/or non-removable) such as, for example, magnetic disks, optical disks, or tape. Such additional storage is illustrated in FIG. 4 by removable storage 508 and non-removable storage 510.

Non-transitory computer-readable media may include volatile and nonvolatile, removable and non-removable tangible, physical media implemented in technology for storage of information, such as computer readable instructions, data structures, program modules, or other data. System memory 502, removable storage 508 and non-removable storage 510 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the user device 500. Any such non-transitory computer-readable media may be part of the user device 500.

In some implementations, the transceivers 512 include any sort of transceivers known in the art. For example, the transceivers 512 may include wired communication components, such as an Ethernet port, for communicating with other networked devices. Also, or instead, the transceivers 512 may include wireless modem(s) to may facilitate wireless connectivity with other computing devices. Further, the transceivers 512 may include a radio transceiver that performs the function of transmitting and receiving radio frequency communications via an antenna.

In some implementations, the output devices 516 include any sort of output devices known in the art, such as a display (e.g. a liquid crystal display), speakers, a vibrating mechanism, or a tactile feedback mechanism. Output devices 516 also include ports for one or more peripheral devices, such as headphones, peripheral speakers, or a peripheral display.

In various implementations, input devices 518 include any sort of input devices known in the art. For example, input devices 518 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 6:
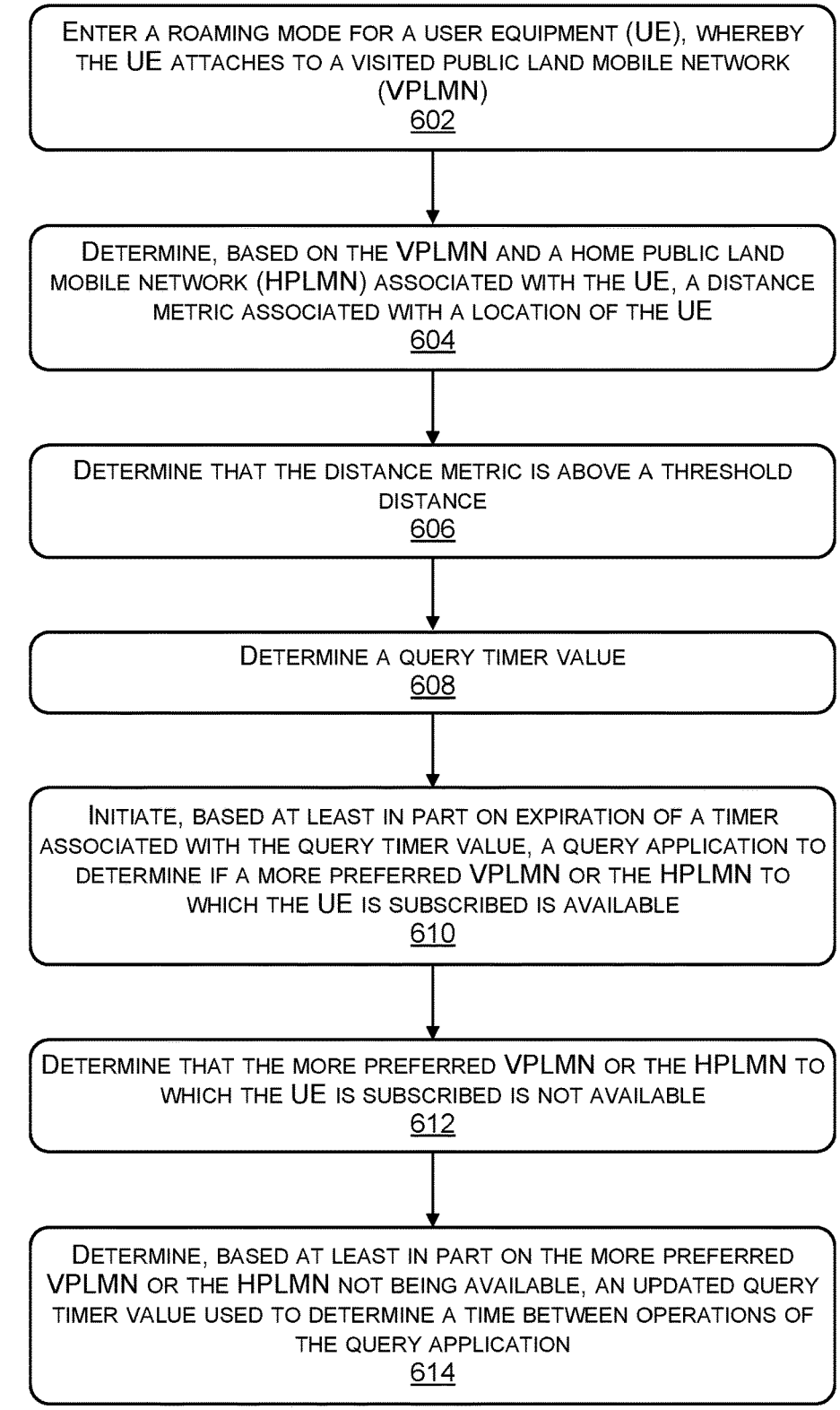
FIG. 6 is an illustrative process for providing intelligent querying for network coverage.

FIG. 6 is an illustrative process 600 for providing intelligent querying for network coverage. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

At operation 602, the process can include entering a roaming mode for a user equipment (UE), whereby the UE attaches to a visited public land mobile network (VPLMN). For example, the operation 602 can include the UE leaving an area supported by a home public land mobile network and attaching to a VPLMN. In some examples, the UE can be idle during the operation 602 (e.g., also referred to a "camping" on the VPLMN).

At operation 604, the process can include determining, based on the VPLMN and a home public land mobile network (HPLMN) associated with the UE, a distance metric associated with a location of the UE. In some examples, the distance metric can be based on, factors including, but not limited to, a mobile country code (MCC), a mobile network code (MNC), GPS data, UE state date (e.g., charging data, display data, battery state, application data, and the like), network data (e.g., ping results for known servers to determine a coarse location), and the like.

At operation 606, the process can include determining that the distance metric is above a threshold distance. In some examples, the distance threshold can be one of a plurality of thresholds, and in some examples, the thresholds can be set by an operator of a HPLMN. In some examples, a UE may use a first algorithm (e.g., the UE may query every 6 minutes) if the UE is within a first threshold. In some examples, the UE may use another algorithm (e.g., based on the distance metric, the UE data, and/or machine learned algorithm) if the is beyond the threshold. In some examples, the UE may not query for additional networks if the UE is beyond a threshold.

At operation 608, the process can include determining a query timer value. In some examples, the operation 608 can include determining a query timer value based on one or more distance metrics, relative locations of the HPLMN and VPLMN, UE data, and the like, as discussed herein. In some instances, a query timer value may be determined based on a number of querying attempts and/or based on a number of maximum query attempts. Techniques for determining a query timer value are discussed throughout this disclosure.

At operation 610, the process can include initiating, based at least in part on expiration of a timer associated with the query timer value, a query application to determine if a more preferred VPLMN or the HPLMN to which the UE is subscribed is available. In some examples, the UE may opportunistically initiate a query application if the battery level is above a threshold or if the UE is connected to power, despite the query timer not having yet expired.

At operation 612, the process can include determining that the more preferred VPLMN or the HPLMN to which the UE is subscribed is not available.

At operation 614, the process can include determining, based at least in part on the more preferred VPLMN or the HPLMN not being available, an updated query timer value used to determine a time between operations of the query application. In some examples, the updated query timer value may be greater than the query timer value to decrease the frequency of initiating the querying application, thereby reducing battery drain.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising: entering a roaming mode for a user equipment (UE), whereby the UE attaches to a visited public land mobile network (VPLMN);
    determining, based on the VPLMN and a home public land mobile network (HPLMN) associated with the UE, a first distance metric associated with a location of the UE at a first time;
    determining that the first distance metric is above a first threshold distance; determining, based at least in part on the first distance metric being above the first threshold distance, a query timer value; initiating, based at least in part on expiration of a timer associated with the query timer value, a query application to determine if a more preferred VPLMN or the HPLMN to which the UE is subscribed is available; determining that the more preferred VPLMN or the HPLMN to which the UE is subscribed is not available; determining, based at least in part on the more preferred VPLMN or the HPLMN not being available, an updated query timer value used to determine a time between operations of the query application; determining, at a second time, that a second distance metric meets or exceeds a second threshold distance that is greater than the first threshold distance; and in response to determining that the second distance metric meets or exceeds the second threshold distance, refraining from initiating the query application.

2. The method of claim 1, wherein the first distance metric is above the first threshold distance at the first time, the method further comprising:
    determining, at a third time after the first time, that a third distance metric is below the first threshold distance; and determining, based at least in part on the third distance metric being below the first threshold distance, the query timer value based at least in part on a multiplication factor and a fixed interval.

3. The method of claim 1, further comprising: determining the query timer value based at least in part on UE state data, wherein the UE state data comprises at least one of:
    battery state data;
    charging state data;
    UE accelerometer data; or
    UE GPS data.

4. The method of claim 1, further comprising: determining the query timer value based at least in part on an estimated time to travel from the location of the UE to a nearest location associated with the HPLMN.

5. The method of claim 1, further comprising: determining that the HPLMN is available; attaching the UE to the HPLMN; and resetting the query timer value to a reset value.

6. The method of claim 1, wherein the updated query timer value is at least one of a same value as the query timer value or greater than the query timer value.

7. The method of claim 1, further comprising: determining at least one of the query timer value or the updated query timer value based at least in part on a machine learning algorithm.

8. One or more non transitory computer readable media storing instructions executable by one or more processors, wherein the instructions, when executed, cause the one or more processors to perform operations comprising: entering a roaming mode for a user equipment (UE), whereby the UE attaches to a visited public land mobile network (VPLMN);
    determining, based on the VPLMN and a home public land mobile network (HPLMN) associated with the UE, a first distance metric associated with a location of the UE at a first time;
    determining that the first distance metric is above a first threshold distance; determining, based at least in part on the first distance metric being above the first threshold distance, a query timer value; initiating, based at least in part on expiration of a timer associated with the query timer value, a query application to determine if a more preferred VPLMN or the HPLMN to which the UE is subscribed is available; determining that the more preferred VPLMN or the HPLMN to which the UE is subscribed is not available; determining, based at least in part on the more preferred VPLMN or the HPLMN not being available, an updated query timer value used to determine a time between operations of the query application; determining, at a second time, that a second distance metric meets or exceeds a second threshold distance that is greater than the first threshold distance; and in response to determining that the second distance metric meets or exceeds the second threshold distance, refraining from initiating the query application.

9. The one or more non-transitory computer-readable media of claim 8, wherein the first distance metric is above the first threshold distance at the first time, the operations further comprising: determining, at a third time after the first time, that a third distance metric is below the first threshold distance; and determining, based at least in part on the third distance metric being below the first threshold distance, the query timer value based at least in part on a multiplication factor and a fixed interval.

10. The one or more non-transitory computer-readable media of claim 8, the operations further comprising: determining the query timer value based at least in part on UE state data, wherein the UE state data comprises at least one of:
    battery state data;
    charging state data;
    UE accelerometer data; or
    UE GPS data.

11. The one or more non-transitory computer-readable media of claim 8, the operations further comprising: determining the query timer value based at least in part on an estimated time to travel from the location of the UE to a nearest location associated with the HPLMN.

12. The one or more non-transitory computer-readable media of claim 8, the operations further comprising: determining that the HPLMN is available; attaching the UE to the HPLMN; and resetting the query timer value to a reset value.

13. The one or more non-transitory computer-readable media of claim 8, wherein the updated query timer value is at least one of a same value as the query timer value or greater than the query timer value.

14. A system comprising: one or more processors; and one or more non-transitory computer-readable media storing computer-executable instructions that, when executed by the one or more processors, cause the system to perform operations comprising:
    entering a roaming mode for a user equipment (UE), whereby the UE attaches to a visited public land mobile network (VPLMN); determining, based on the VPLMN and a home public land mobile network (HPLMN) associated with the UE, a first distance metric associated with a location of the UE at a first time; determining that the first distance metric is above a first threshold distance; determining, based at least in part on the first distance metric being above the first threshold distance, a query timer value; initiating, based at least in part on expiration of a timer associated with the query timer value, a query application to determine if a more preferred VPLMN or the HPLMN to which the UE is subscribed is available; determining that the more preferred VPLMN or the HPLMN to which the UE is subscribed is not available;

determining, based at least in part on the more preferred VPLMN or the HPLMN not being available, an updated query timer value used to determine a time between operations of the query application; determining, at a second time, that a second distance metric meets or exceeds a second threshold distance that is greater than the first threshold distance; and in response to determining that the second distance metric meets or exceeds the second threshold distance, refraining from initiating the query application.

15. The system of claim 14, wherein the first distance metric is above the first threshold distance at the first time, the operations further comprising:

determining, at a third second time after the first time, that a third distance metric is below the first threshold distance; and determining, based at least in part on the third distance metric being below the first threshold distance, the query timer value based at least in part on a multiplication factor and a fixed interval.

16. The system of claim 14, the operations further comprising: determining the query timer value based at least in part on UE state data, wherein the UE state data comprises at least one of:

battery state data;

charging state data;

UE accelerometer data; or

UE GPS data.

17. The system of claim 14, the operations further comprising: determining the query timer value based at least in part on an estimated time to travel from the location of the UE to a nearest location associated with the HPLMN.

* * * * *